UNITED STATES PATENT OFFICE.

HERMAN HEUSER, OF CHICAGO, ILLINOIS.

MANUFACTURE OF LIQUID-CONDENSED YEAST-TREATED EXTRACTS FROM BEVERAGES.

1,290,192.      Specification of Letters Patent.      Patented Jan. 7, 1919.

No Drawing.      Application filed April 5, 1917. Serial No. 159,909.

*To all whom it may concern:*

Be it known that I, HERMAN HEUSER, a citizen of the United States, residing at Chicago, in the county of Cook and State of Illinois, have invented certain new and useful Improvements in the Manufacture of Liquid-Condensed Yeast-Treated Extracts from Beverages, of which the following is a specification.

My invention refers to the manufacture of liquid condensed yeast-treated extracts or syrups from beverages in which the ratio of fermentable to unfermentable substances has been reduced, and its object is to provide a yeast-treated liquid condensed extract that will change, without fermentation, simply by dilution with water into a beverage possessing the characteristic flavor and taste due to the action of yeast.

For illustrating the practice of my invention an unfermented beverage, for example beer wort, containing say 7% of fermentable substances and 7% of unfermentable substances, is subjected to fermentation with yeast by pitching the same with one pound of thick-fluid yeast to each barrel of wort and fermenting the pitched wort at suitable fermentation temperatures, say between 46 and 55° Fahrenheit. When the reduction of the fermentable carbohydrates by the fermentation of the yeast has reached the desired degree, say when the amount of fermentable substances left unfermented is 1%, fermentation is arrested by any known way, as for instance by filtering the yeast from the fermenting wort.

The wort thus arrested in fermentation possesses a reduced ratio of fermentable to unfermentable substances of 1 to 7, while in the original wort the ratio was 1 to 1. The reduced wort is then condensed to the desired consistency, for example to a syrup having an extract of about 50%, this condensation preferably being accomplished in a vacuum high enough for boiling evaporation to take place for the removal of the alcohol and the desired quantity of water at a temperature below 80° Fahrenheit or any other suitably low temperature that will preserve the constituents of the reduced wort in soluble state.

The liquid condensed extract is then subjected to yeast-fermentation to impart to it such characteristics in taste and flavor as can be imparted to the extract only by yeast fermentation, and for this purpose the extract or syrup is cooled to yeast-fermentation temperature and then is pitched with yeast in active condition and preferably while stirring takes place to expedite fermentation. The yeast is preferably in large quantity, for example about twice as much in respect to the amount of fermentable carbohydrates as is usually employed to pitch ordinary fermented beverages. The extract does not require any addition of sugar or other fermentable substances, because being made from a reduced or partly fermented beverage it already contains such fermentable substances, in the present instance to the amount of 1%, and it contains them with the same characteristics as in the beverage from which the extract was made. The syrup or extract is left exposed to the action of the yeast, preferably in a closed and pressure-proof container, until it has acquired the desired characteristics imparted by the action of and contact with the yeast, which may be ascertained by sampling. The amount of alcohol produced in this yeast-treated extract is in proportion to the amount of fermentable carbohydrates contained in the base extract. Unlike the fermentation of beverages, the liquid condensed extracts ferment very slowly on account of the slow diffusion of the fermentable substances through the cell membrane of yeast.

The resulting yeast-treated liquid condensed extract possesses the characteristic flavor and taste of the original beverage that can be produced and imparted only by yeast-fermentation, and it is naturally alcoholic; preferably it is clarified, and when suitably diluted with water as customary with soft-drink syrups it provides a beverage having the flavor and taste of the original beverage imparted by yeast-fermentation. Neither the dealer nor the user is required to pitch and ferment the diluted beverage, as the yeast-treated extract obviates these steps, and the alcohol content makes it directly applicable for the production of alcohol-reduced beverages.

It is obvious that this invention is applicable and of advantage in the manufacture of liquid condensed yeast-treated extracts from all kinds of reduced or partly fermented beverages, whether made from grain material in conjunction with malt or without the malt, or from fruit juice as for example grape juice or apple juice.

I am aware of the patent to Lockwood Number 169,818, dated November 9, 1875, which describes a method of condensing ordinary beer for making a product that is adapted to be subsequently diluted with water, and the reconverted or remade beverage is then to have either alcohol or yeast and fermentable matter (sugar) added to it; it is obvious that Lockwood's extract or concentrated liquid is not yeast-treated or subjected to the action or effect of yeast-fermentation and so is not naturally alcoholic and does not have the taste and flavor due to yeast-fermentation; and consequently the diluted beverage or mixture formed by adding water to his extract does not possess the characteristics imparted by yeast-fermentation, but in order to provide these characteristics it is necessary for the dealer or consumer to add yeast to Lockwood's diluted beverage and then to ferment the dilution, which requires knowledge and skill not ordinarily possessed by consumers or dealers. I am also aware of the patent to Uhlmann No. 613,915 dated November 8th, 1898, which is also for a process for treating ordinary beer or any other "malt liquor which has been completely fermented" (page 2, lines 56–7), and states (page 2, lines 13–15) that this process "does not contemplate the evaporation of any material part of the water, and is therefore not a process of condensation", from which it is apparent that Uhlmann does not even make a condensed extract, much less a condensed extract of a beverage that is only partly fermented.

I claim:—

1. As a new article of manufacture a syrup of a partly fermented beverage subjected to the effects of yeast-fermentation, and capable of conversion into a potable beverage by mere water-dilution.

2. As a new article of manufacture a syrup of partly fermented beer wort subjected to the effect of yeast-fermentation, and capable of conversion into a potable beverage by mere water-dilution.

3. The process of making yeast-treated syrups capable of conversion into a beverage by mere water-dilution which consists in partly fermenting a beverage, condensing the partly fermented beverage to a syrup, and subjecting the syrup to the effect of yeast-fermentation.

4. The process of making a syrup capable of conversion into a beverage by mere water-dilution which consists in pitching beer wort, fermenting the wort until the ratio of fermentable to unfermentable substances is reduced to a predetermined amount, stopping the fermentation, condensing the partly fermented wort to a syrup, and subjecting the syrup to yeast-fermentation In testimony whereof I affix my signature in presence of two witnesses.

HERMAN HEUSER.

Witnesses:
J. McRoberts,
E. Wilcox.